United States Patent [19]

Soeder et al.

[11] Patent Number: 5,019,266
[45] Date of Patent: May 28, 1991

[54] WASTE WATER PURIFICATION PROCESS WITH BATCHWISE SUPPLY OF WASTE WATER TO THE ACTIVATED SLUDGE TANK

[75] Inventors: Carl-Johannes Soeder, Dortmund; Erich Zanders, Elsdorf; Thomas Raphael, Dortmund; Heiner Keusen, Juelich; Joost Groeneweg, Kreuzau, all of Fed. Rep. of Germany

[73] Assignee: Forschungszentrum Juelich GmbH, Juelich, Fed. Rep. of Germany

[21] Appl. No.: 174,386

[22] Filed: Mar. 28, 1988

[30] Foreign Application Priority Data

Mar. 28, 1987 [DE] Fed. Rep. of Germany ....... 3710325

[51] Int. Cl.$^5$ ............................................. C02F 3/30
[52] U.S. Cl. ................................... 210/605; 210/614; 210/630; 210/903
[58] Field of Search ............... 210/614, 903, 605, 610, 210/620, 628, 629, 630, 631

[56] References Cited

U.S. PATENT DOCUMENTS

| 4,437,992 | 3/1984 | Saito et al. ................. 210/614 X |
| 4,705,633 | 11/1987 | Bogusch ...................... 210/614 |
| 4,772,396 | 9/1988 | Voyt ........................... 210/903 X |
| 4,793,930 | 12/1988 | Soeder et al. ................ 210/614 |

FOREIGN PATENT DOCUMENTS 0200875 11/1986 European Pat. Off. .
2149552 4/1972 Fed. Rep. of Germany .
2333675 1/1974 Fed. Rep. of Germany .

OTHER PUBLICATIONS

R. Kayser, et al., Wasser und Boden 5 (1982) 186–193, "Simultane Stickstoffelimination—Beitrag zur praktischen Anwendung auf Kläranlagen" (Simultaneous Nitrogen Removal—Practical Application to Water Purification Plants).

Primary Examiner—Tom Wyse
Attorney, Agent, or Firm—Foley & Lardner

[57] ABSTRACT

Aerobic purification of waste water with intermittent batchwise supply of waste water to the activated sludge tank from which the treated waste water drains continuously is disclosed, in which the nitrate content in the waste water is simultaneously reduced by throttling the aeration of the activated sludge tank, starting with the admission of the waste water to the tank, to values equivalent to less than or equal to 0.5 mg/l dissolved oxygen. In particular, aeration may be off until such time as the nitrate content in the tank has dropped below 5 mg/l, in particular below 1 mg/l. In the case of urban waste waters a cycle time of about 1 hour is expediently employed under these circumstances and the aeration is shut off for about 5 minutes, starting from the rapid admission of the waste water charge. Preferably, inlet charges are less than or equal to 30%, in particular between about 5% and 20%, of the tank capacity. In this procedure, nitrate present is degraded in the phase involving oxygen throttling, while in the subsequent phase (over longer times) ammonium fed in with the waste water supplied is converted into nitrate, provision being made for a sufficient population of nitrifying bacteria in the tank.

11 Claims, 1 Drawing Sheet

WASTE WATER PURIFICATION PROCESS WITH BATCHWISE SUPPLY OF WASTE WATER TO THE ACTIVATED SLUDGE TANK

BACKGROUND OF THE INVENTION

The present invention relates to an aerobic waste water purification process with intermittent batchwise supply of waste water to the activated sludge tank from which treated waste water drains continuously, the waste water inlet being opened up for a short time whenever the intensity of the bacterial metabolism in the tank has dropped below a specified value.

In biological waste water purification plants, the intention is to reduce the pollution load of the waste water by bacterial degradation. Thus, carbon compounds are degraded in the aerobic waste water purification in activated sludge tanks, but in addition, in plants in which certain sludge loading ranges are not exceeded or nitrifying bacteria can be enriched, oxidation of ammonium is also possible. The following table shows sludge loading ranges which permit a simultaneous nitrification.

TABLE 1

Dimensioning values for one-stage activated sludge plants with nitrification

| Temperature in activated sludge tank in °C. | Age of sludge dried matter in d | $BOD_5$ sludge load in kg/(kg · d) | Residence time of the waste water for rain discharge in h |
|---|---|---|---|
| 5 | 15 | 0.1 | approx. 5 to 12 |
| 10 | 7 | 0.2 | approx. 2.5 to 6 |
| 15 | 4 | 0.3 | approx. 1.5 to 4 |
| 20 | 3 | 0.4 | approx. 1.5 to 3 |

The final product of the ammonium oxidation is nitrate which is used by certain organisms as a terminal hydrogen acceptor under anoxic conditions. Since anoxic conditions occur mainly in the final clarification in conventional activated sludge plants, denitrification results at that point. Either extracellular or intracellular carbon compounds serve as electron donors for the microorganisms under these conditions.

The nitrogen liberated in this type of nitrate reduction rises in the form of small bubbles and drives the activated sludge upwardly.

Rising sludge cannot be recycled into the activated sludge tank and drains off with the purified water. Consequently, this sludge is no longer available for purifying the waste water and, in addition, considerably pollutes the receiving watercourse as a result of its strong oxygen-depleting characteristic.

An effective water process control is possible only if, as a result of a systematic process control (in relation to the elimination of nitrogen), denitrification is successfully prevented in the final clarification tank and at the same time a substantial nitrogen elimination is successfully achieved in the sludge activation.

A number of waste water purification processes attempt to satisfy this requirement by carrying out controlled denitrification. Upstream or simultaneous denitrification in one-stage activated sludge plants are conventional methods which are often employed. They often function fairly ineffectively since there is hardly any possibility of substantially affecting the process. Waste water treatment technology is more likely to offer suggestions (Boehnke et al in Korrespondenz Abwasser 1986, pages 1125–33) which are always, however, associated with considerable expense. A further possibility is offered by the carousel process (Eggert in Industrieabwasser 1985, pages 17–23) which, however, can be implemented only in plants which are to be refitted.

SUMMARY OF THE INVENTION

It is therefore an object of the invention to provide a waste water purification process in which a constantly low nitrate content can be achieved in the waste water by appropriate control without separate additional process steps.

It is a further object of the invention to provide an apparatus for purifying waste water with appropriate control.

These and other objects have been achieved, according to the invention, by modifying an aerobic waste water purification process, already developed by the applicants' assignee, with intermittent batchwise waste water supply to the activated sludge tank of the type mentioned in the introduction, so that the aeration of the activated sludge tank, starting from the admission of waste water to the tank, is throttled to values equivalent to less than or equal to about 0 5 mg/1 dissolved oxygen until such time as the nitrate content in the tank has dropped below a preset nitrate limit value. The waste water is admitted to the activated sludge tank in response to a decrease in the intensity of bacterial metabolism below a specified value. The apparatus for carrying out the process includes means for monitoring nitrate content in the activated sludge tank.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
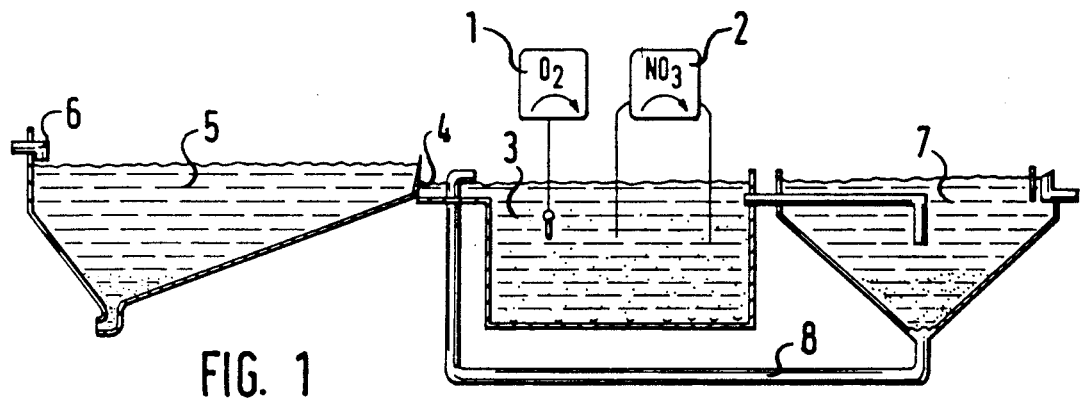
FIG. 1 is a diagrammatic representation of the process according to the invention during aeration.

In the process according to the invention with batchwise addition of waste water, the aeration is throttled or discontinued during the rapid addition of waste water (up to 30% of the tank capacity), and specifically until such time as the nitrate falls below a certain nitrate limit value in the tank. During this first anoxic phase, the nitrate in the tank (present from the preceding phase) is rapidly degraded by denitrifying bacteria for which sufficient carbon compounds are in any case available as a supply of energy. During the subsequent aeration phase which is accompanied by degradation of carbon compounds, oxygen is available, in particular as the waste water is progressively purified so that ammonium introduced with the batch of waste water is now oxidized to nitrite or nitrate. These compounds are then eliminated in turn by denitrification during the next batchwise addition of waste water and throttling or shutting off of the oxygen supply.

The end of the carbon compound degradation and nitrification phase (and the control of the renewed batchwise addition of waste water) can be defined not only, as in the older process for waste water purification with intermittent waste water supply according to European Patent Application No. 0,200,875, (the contents of which are hereby incorporated by reference) by means of the rise in the oxygen content in the tank above a particular limit value but also by means of the reading of a nitrate content in the tank. The nitrate content is dependent on the input of nitrogen compounds with the batch of waste water supplied and is intended to have reached a limit value corresponding to the nitrogen input.

The plant and the execution of the process are largely similar to the type described by the applicant in European Patent Application No. 0,200,875. According to the present invention, however, an oxygen measuring instrument 1 and also a nitrate measuring instrument 2 are provided in the activated sludge tank 3 for controlling the supply of waste water to the tank 3 and the oxygen content of the latter. The waste water is supplied batchwise via a suitably controlled weir 4 which allows waste water to run into the activated sludge tank 3 from the preliminary clarification tank 5 (with inlet 6) in a particular quantity in a relatively short time, after which the inlet of waste water to the activated sludge tank is interrupted and the incoming waste water is retained n the preliminary clarification tank behind the weir.

Figure 2:
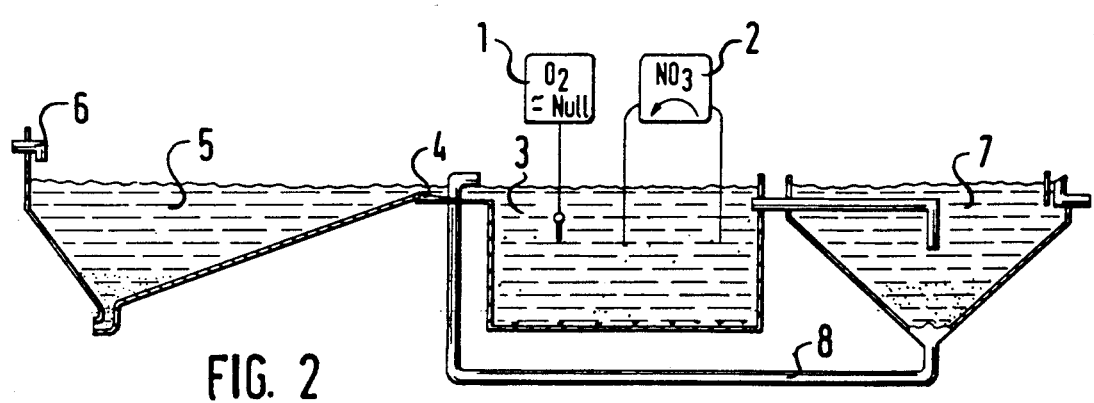
FIG. 2 is a diagrammatic representation of the process according to the invention during oxygen throttling.

From the activated sludge tank 3, water flows continuously into the final clarification tank 7 from the bottom end of which a sludge return 8 leads to the activated sludge tank 3 as shown in FIGS. 1 and 2. Of these, FIG. 1 shows the relatively long-term carbon compound degradation and nitrification condition with aeration, while FIG. 2 indicates the batchwise supply of waste water to the activated sludge tank and denitrification with oxygen throttling.

The simplest way to throttle the oxygen supply is to shut off the aeration completely until the nitrate content in the activated sludge tank has dropped below a value of about 5 mg/l, in particular below about 1 mg/l.

A necessary condition is a sufficient population of nitrifying bacteria in the activated sludge tank and this requires (without special measures) that certain sludge load ranges are maintained (see above).

In the case of urban types of waste water, the cycle time will preferably amount to about one hour with a rapid supply within about 0.5 to 15 minutes, in particular in about 2 minutes, with nitrate dropping below the desired nitrate levels within about 10 minutes.

The tank contents are preferably circulated during the anoxic phase. Quantities of less than or equal to about 30%, in particular about 5% to 20%, of the tank capacity are expedient for the batchwise measured addition of waste water.

The process described above for waste water purification with substantial nitrogen elimination has already been tested in two different systems:
1. On a model scale with synthetic waste water.
2. On a semi-industrial scale with urban waste water.

These two examples are illustrative of the present invention and are non-limiting.

EXAMPLE 1

Intermittent measured addition of waste water with maintenance of a defined anoxic phase for the purpose of simultaneous nitrification and denitrification in activated sludge processes on a laboratory scale.

Experiments on nitrogen elimination with batchwise measured addition of waste water were carried out with two laboratory clarification plants (activation volume 8 liters).

One plant was conventionally charged continuously (CWD: continuous measured waste water addition) while the second was charged batchwise (BWD: batchwise measured waste water addition). In the case of BWD the waste water was retained for 55 minutes and a measured quantity added to the activated sludge tank in the course of 5 minutes. During and after the measured addition of waste water, aeration was considerably reduced for 15 minutes. Thorough mixing was guaranteed by stirring mechanisms.

| Operating parameters: | |
|---|---|
| Sludge Load (SL) | = 0.23 g COD/g. DM/d |
| Sludge return ratio | = 100% |
| Residence time | = 12 hours |
| Dry Matter content (DM) | = 3 g/l |
| C:N | = 100:20 |
| $O_2$ content | CWD  3 mg/l |
| | BWD before substrate charging  5 mg/l |
| | after substrate charging  0 mg/l |
| pH | 7.5 |
| Temperature | 20° C. |

In these experiments the sludge age necessary for the nitrification with particle free inlet (C source → 50% ethanol + 50% acetate) was satisfactorily achieved. Both plants nitrified the ammonium in the supply almost completely ($NH^+_4$ discharge $\leq$ 2 mg/l).

In the case of CWD, however, activated sludge was often flushed out as a result of uncontrolled denitrification in the final clarification. Due to these malfunctions, the nitrification came to a standstill from time to time and $NH^+_4$ concentrations of more than 60 mg/l were measured in the discharge.

These problems did not occur in the BWD plant. An approximately complete nitrification was achieved over the entire experimental period. The denitrification did not take place in the final clarification tank as in the case of CWD, but in the activated sludge tank. By the end of the anoxic phase, all the nitrate and nitrite was denitrified. In total, approximately 90% of the nitrogen was completely eliminated.

Furthermore, the CWD plant had a tendency to bulking sludge formation. Sludge volume indices (SVI) of over 500 ml/g of dry matter were not a rarity under the circumstances. The $SVI_{30}$ in the BWD plant was fairly stable and was always below 150 ml/g of dry matter.

The laboratory-scale experiments demonstrate that it is possible to nitrify and denitrify simultaneously in a single-stage sludge activation process with batchwise addition of waste water and a defined anoxic phase.

EXAMPLE 2

Intermittent measured addition of waste water with the maintenance of a defined anoxic phase for the purpose of simultaneous nitrification and denitrification in the activated sludge process on a semi-industrial scale.

Two semi-industrial experimental plants with an activation volume of 1 m³ were installed in the central clarification plant in Duren and charged with the waste water received there (50% urban, 50% industrial). One plant was supplied continuously (CWD) and the other was supplied batchwise (BWD) with waste water. Depending on the duration of the anoxic phase which results from the high oxygen depletion after the measured addition of waste water, a substantial denitrification could be achieved in the activated sludge tank. If a defined anoxic phase was maintained by throttling the oxygen input to dissolved $O_2$ values of "zero" after adding waste water for 5 to 20 minutes, a 90% nitrogen elimination was achieved.

In the case of CWD, an uncontrolled denitrification in the final clarification tank was often observed and this led to sludge being expelled. This expulsion of sludge produced a reduction in the biomass in the activated sludge tank and as a result shortened the sludge age, which resulted in a prevention of the denitrification.

These processes (nitrification, sludge expulsion) alternated all the time so that very variable discharge values were measured.

As in the laboratory experiments, in the case of CWD, the $SVI_{30}$ was always higher and subject to more violent variations than in the case of BWD.

| Operating parameters: | |
| --- | --- |
| Volume of activated sludge tank (VAST) | 1 m³ |
| Volume of final clarification tank (VFCT) | 0.75 m³ |
| Sludge Load (SL) | 0.2 kg BOD₅/kg of DM/d |
| Sludge return ratio | = 100% |
| Residence time | = approx. 8 hours |
| Dry Matter content | 3 g/l |
| $O_2$ content | CWD = approx. 1 mg/l BWD before substrate charging 4.5 mg/l BWD after substrate charging 0 mg/l (for different times). |
| pH | approx. 7.5 |
| Temperature | approx. 20° C. |
| C:$T_{KN}$ | Δ 100:14 |

What is claimed is:

1. A waste water purification process comprising the steps of:
   rapidly admitting waste water to an activated sludge tank in response to a decrease in bacterial metabolism below a predetermined value, the volume of waste water admitted being at most about 30% of the volume of the tank;
   throttling aeration during admission of the waste water to a value equivalent to an amount of dissolved oxygen less than or equal to about 0.5 mg/l until the nitrate content in the tank has dropped below a preset nitrate limit value, and then
   aerating the waste water;
   treated waste water being continuously discharged from the tank during the purification process.

2. A process according to claim 1, wherein the aeration is throttled until the nitrate content in the tank has dropped below a value of about 5 mg/l.

3. A process according to claim 1, wherein the aeration is throttled until the nitrate content in the tank has dropped below a value of about 1 mg/l.

4. A process according to claim 1 further comprising a sufficient population of nitrifying bacteria in the activated sludge tank to oxidize the ammonium present.

5. A process according to claim 4, wherein at temperatures between about 5° C. and 20° C., BOD₅ sludge loads of about 0.1 to 0.4 kg BOD₅/kg of DM/d are employed.

6. A process according to claim 1, wherein urban waste waters are treated and the waste water is admitted batchwise with a cycle time of about 1 hour, the aeration being shut off for about 5 minutes, starting from the rapid admission of the waste water charge.

7. A process according to claim 6, wherein the waste water is admitted within 0.5 to 5 minutes.

8. A process according to claim 2, wherein the tank contents are stirred during the throttled aeration phase.

9. A process according to claim 1, wherein the waste water is admitted in about 2 minutes.

10. A process according to claim 1, wherein the quantity of waste water added is about 5% to 20% of the tank capacity.

11. A process according to claim 1, wherein treated waste water exits from the activated sludge tank at a constant rate.

* * * * *